United States Patent [19]

Mogensen et al.

[11] Patent Number: 5,662,343
[45] Date of Patent: Sep. 2, 1997

[54] CONTAINER BASE WITH THREE PERPENDICULAR FIXING ELEMENTS IN THE CORNERS

[75] Inventors: Erling Kristen Mogensen, Middelfart; Kent Weel Sørensen, Asperup; Berno Holmgaard Jensen, Tommerup; Peder Hans Ingvartsen, Middelfart, all of Denmark

[73] Assignee: Container Centralen A/S, Odense V., Denmark

[21] Appl. No.: 481,477

[22] PCT Filed: Jan. 14, 1994

[86] PCT No.: PCT/DK94/00024

§ 371 Date: Aug. 4, 1995

§ 102(e) Date: Aug. 4, 1995

[87] PCT Pub. No.: WO94/15845

PCT Pub. Date: Jul. 21, 1994

[30] Foreign Application Priority Data

Jan. 15, 1993 [DK] Denmark .................. 0049/93

[51] Int. Cl.$^6$ .................................................. B62B 3/02
[52] U.S. Cl. .................................................. 280/79.11
[58] Field of Search .................. 280/79.11, 79.3, 280/47.34, 47.35, 47.36, 47.16, 47.17, 47.18, 33.998; 206/386

[56] References Cited

U.S. PATENT DOCUMENTS

| 968,316 | 8/1910 | Beckert | 280/79.11 |
| 1,601,859 | 10/1926 | Johnson | 280/47.34 |
| 2,604,334 | 7/1952 | Schultz | 280/47.35 |
| 4,863,179 | 9/1989 | Isaacs | 280/47.34 |
| 4,921,264 | 5/1990 | Duffy | 280/79.11 |

FOREIGN PATENT DOCUMENTS

| 590383 | 6/1987 | Australia . | |
| 0336773 | 11/1989 | European Pat. Off. . | |
| 32 34 921 | 3/1984 | Germany | 206/386 |
| 3036480 | 1/1989 | Germany . | |
| 1 379 063 | 1/1975 | United Kingdom | 280/79.3 |
| 2 033 847 | 5/1980 | United Kingdom | 280/79.11 |

Primary Examiner—Richard M. Camby
Assistant Examiner—Frank Vanaman
Attorney, Agent, or Firm—Merchant, Gould, Smith, Edell, Welter & Schmidt, P.A.

[57] ABSTRACT

A container base (5) is adapted to receive various types of side-boards owing to a new corner structure. The corner structure is characterized in that coupling means can be inserted in two mutually perpendicular horizontal directions and in a vertical direction. This is achieved in that a pair of pipe profiles (10, 11) has open ends to receive coupling means, and by the provision of a further pipe profile (12) which extends perpendicularly to the pipe profiles (10, 11). The further pipe section is terminated at the same level as or below the lower side wall of the substantially horizontal pipe parts and is secure to the lower wall edges of these. All pipe profiles are located in such a way that they do not prevent introduction of a coupling means into any of the pipe profiles of the corner.

10 Claims, 5 Drawing Sheets

CONTAINER BASE WITH THREE PERPENDICULAR FIXING ELEMENTS IN THE CORNERS

The invention concerns a base frame adapted to be built together with et least one upper part, said base comprising a rectangular frame structure which is essentially horizontal in use and has hollow profile pipes serving as guide and fixing elements for the upper part in the mounting thereof.

Such container bases are widely used in connection with carriage bottoms whose corners are adapted to receive side-boards. Containers of this type are known in many versions fur the transport, possibly also for the display of various goods, e.g. boxes, flowers, clothing end food products. So far, a container base end associated side-boards have been designed for a specific use, and the use has decided whether the side-boards are fitted by vertical or horizontal mounting on the container base.

EP-A-366 773 discloses a container base on which side members may be mounted, since the container base is provided with horizontal pipe parts for receiving end retaining locking parts mounted on the side members. It will not be directly possible to use the container base in connection with other kinds of upper frame constructions.

The object of the invention is to provide a container base which can serve to fix several types of side-boards.

This object is achieved in that the container base is constructed as stated in the characterizing portion of claim 1. This structure ensures that the coupling means of the side-boards can be inserted both in a vertical direction end in two mutually horizontal directions, which results in a more flexible container base.

The container base is therefore particularly expedient for multi-purpose use, so that a single type of container base is now sufficient for the retailers, on which several types of side-boards may be mounted, depending upon the commodity to be transported in the container. For multi-purpose use it is expedient to provide the rim of the container base with some upwardly extending flaps which can control goods on the container, without there being provided separate side-boards.

The invention is thus characterized in that none of the profile pipes at the corners of the container base prevents insertion of fasteners for a side-board into the end of one of the other profile pipes in the corner. It is not necessary that a coupling means of a side-board fills the profile pipe completely, which, however, is a preferred embodiment, as stated in claim 2. Claim 2 moreover states the presence of a stiffening element which, in combination with the features stated in claim 3, provides a very stiff corner structure.

Claim 4 defines a preferred embodiment of the stiffening element, while claims 5 and 6 define further features of the stiffening element.

Claim 7 defines an embodiment for the fixing of a side-board when this is introduced from the side.

It will be readily appreciated how side-boards can be fixed by vertical mounting, i.e. in that the side-boards have some downwardly extending pins to be received in the substantially vertical profile pipes of the container base.

Claim 8 defines a preferred embodiment, while claims 9 and 10 define a preferred use of the container base according to the invention.

The invention will be explained more fully below in connection with preferred embodiments and with reference to the drawings, in which FIG. 1 is a sectional view of a preferred embodiment of a container base according to the invention, FIG. 2 is a plan view of the container base shown in FIG. 1, FIG. 3 is a detailed view of a corner area of the container base shown in FIGS. 1 and 2, FIG. 4 is a top view of the corner structure on a container base according to the invention, FIG. 5 is a lateral view of the corner structure shown in FIG. 4, FIG. 6 shows a corner structure according to the invention in connection with a detachable side-board, FIG. 7 shows a second view of a corner structure according to the invention in connection with a detachable side-board;

Figure 2:
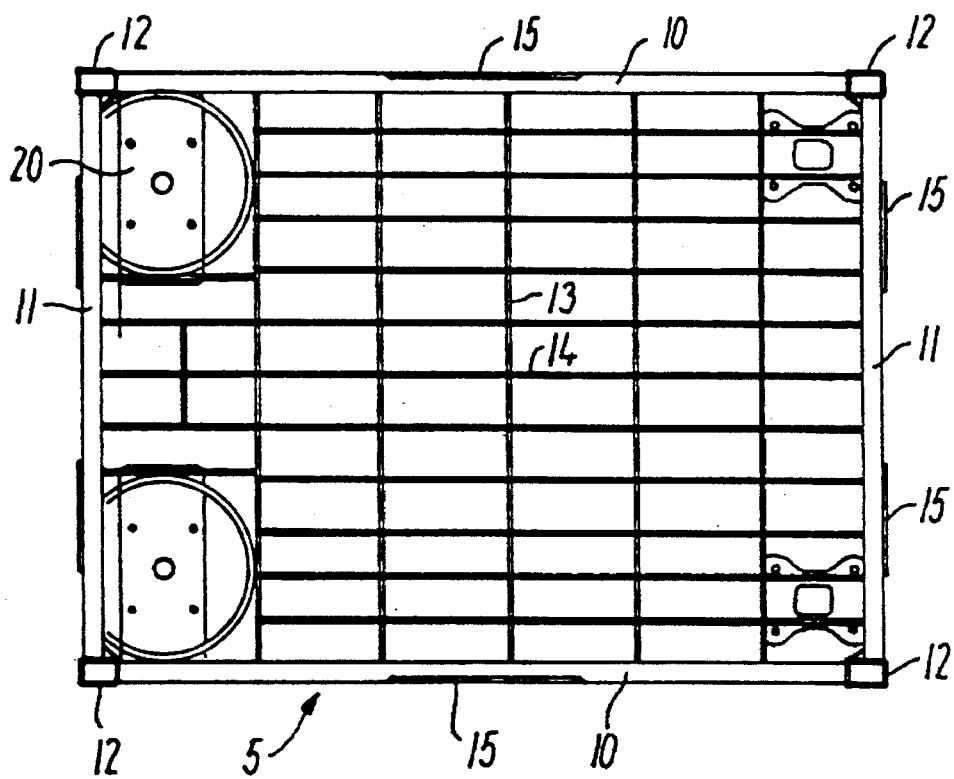
Figure 3:
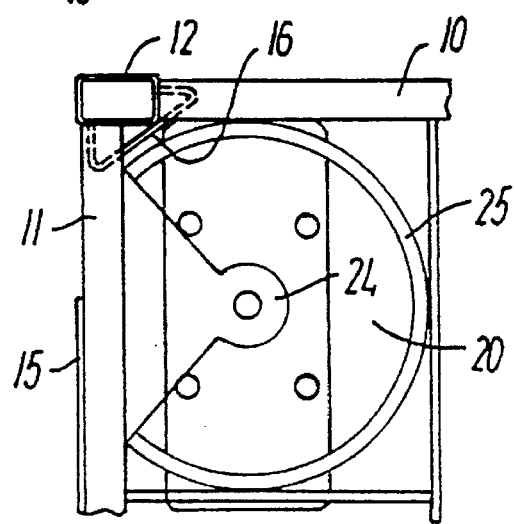

FIG. 2 is a plan view of a container base according to the invention, and in a preferred embodiment it is constructed as a carriage bottom for a roller carriage. This carriage has a rectangular frame 5 with two longitudinal frame parts 10 which may expediently be made of hollow metal profile pipes of rectangular cross-section, as well as with two transverse frame parts 11, which preferably have the same structure as the frame parts 10. The frame parts 10, 11 are assembled via respective vertical, hollow pipe sections 12 at each corner to form the rectangular frame 5.

In addition, the frame 5 has a plurality of transverse metal bands 13 which, together with longitudinal metal wires 14, stiffen the frame and form a carrier face for goods placed on the roller carriage. The bands 13 and the wires 14 are attached to the frame 5 by welding, and the resulting carrier face is flush with the upper edge of the frame parts 10, 11. The carrier face is restricted by stop plates 15 welded on the outer sides of the frame parts 10, 11. In addition, the frame parts 10, 11 are stabilized at the corners by stiffening elements 16, which will be discussed in detail later.

Figure 1:
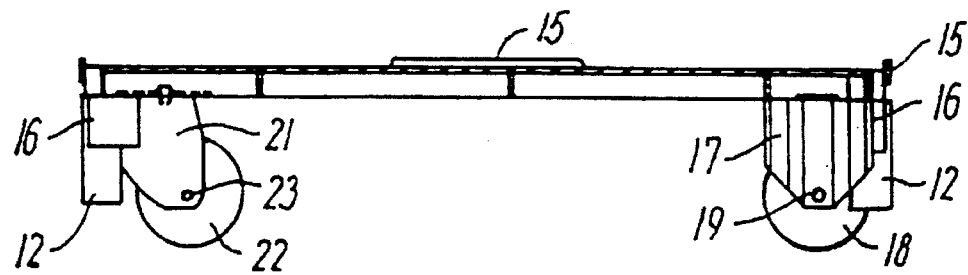

Respective wheel forks 17, which are fixed between the frame parts 11 and one of the metal bands 13, are mounted at the corners at one end of the roller carriage, each of said wheel forks having a fixedly oriented wheel 18 mounted on a horizontal shaft 19, which appears from FIG. 1. A wheel bracket 20, on which a wheel fork is mounted pivotally about a vertical axis, is provided at each corner at the other end of the roller carriage. Each of the wheel forks 21 has a horizontal shaft 23 on which a wheel 22 is mounted.

When two carriage bottoms are stacked, the wheels 18, 22 are retained on the brackets 17 on a lower roller carriage between two wires 14 and between the frame part 11 and a band 13. At the other end of the roller carriage the pivotable wheels 22 of a roller carriage are retained on brackets 20 of a lower roller carriage, said wheels being permitted to have an essentially free orientation since each of the brackets 20 has a conical elevation 24 with a coaxially arranged hoop 25 between which the wheel 22 stands. This is described in detail in the applicant's own Danish patent application 1537/92.

It will be seen from FIG. 1 that the pipe sections 12 extend downwards to terminate at a distance above the ground, it being thereby possible to stack the roller carriages. The length of the pipe sections 12 must not exceed the distance from the upper side of the brackets 20 to the ground, and should preferably be somewhat smaller.

Figure 4:
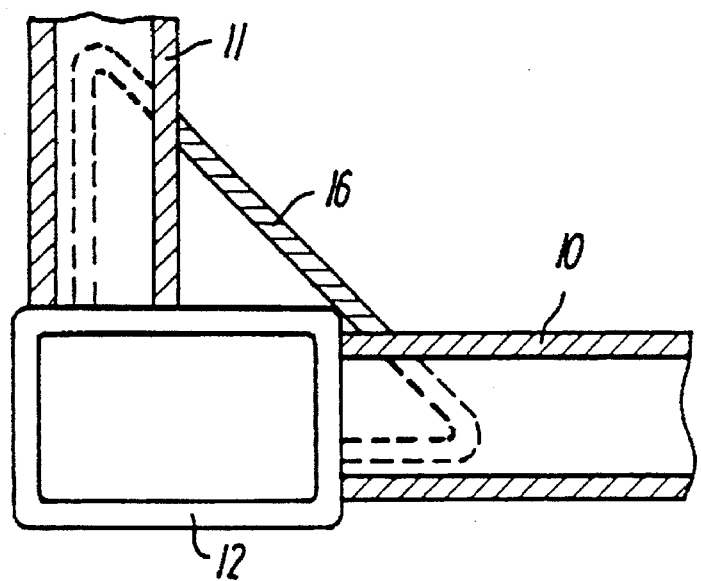
Figure 5:
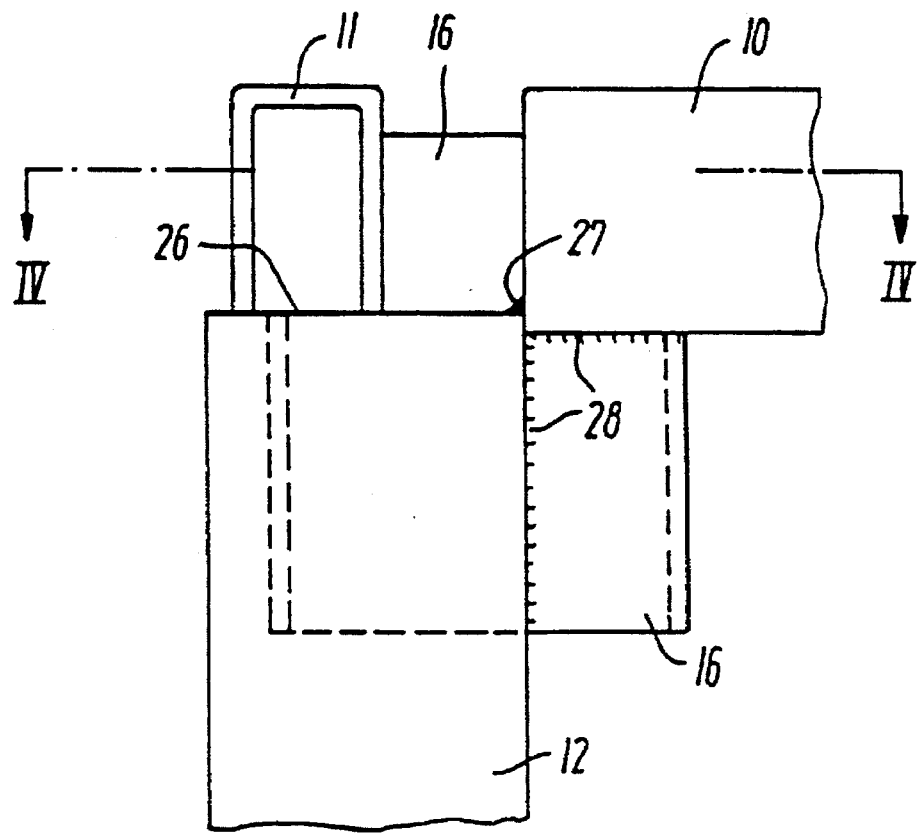

FIG. 4 together with FIG. 5 shows how the corner joint is made in a preferred embodiment. The pipe section 12 is terminated at the same level as the internal bottom face of the frame parts 10, 11 and is secured to the end edges of respective frame parts 10, 11 by welded seams 26 and 27, respectively. It will thus be seen that the frame parts 10, 11 are not secured directly to each other, but for particularly exacting uses the frame parts 10, 11 can be fixed with respect to each other through an angle bar (not shown), which is secured in a known manner to the rear sides 29 of the frame parts 10, 11 so that the opening in the pipe member 12 is not blocked.

In the shown embodiment the stiffening element 16 is made of bent sheet iron and is secured at its ends to the pipe member through the weld 28. Optionally, the stiffening element 16 may also be welded to the adjacent frame parts 10, 11 at its edges facing the frame parts 10, 11, as the welded seams 30 provided hereby increase the strength of the corner joints.

Figure 7:
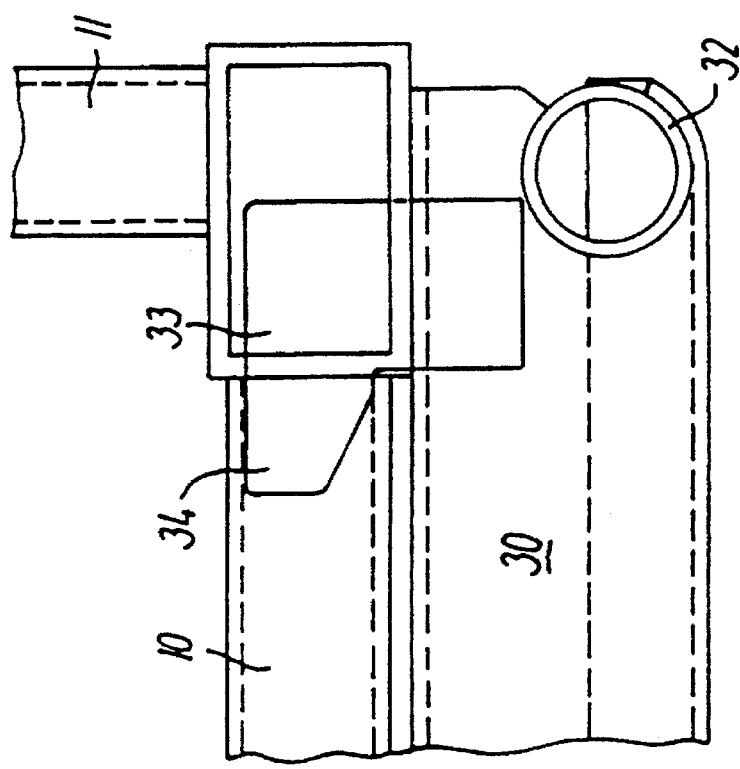
Figure 6:
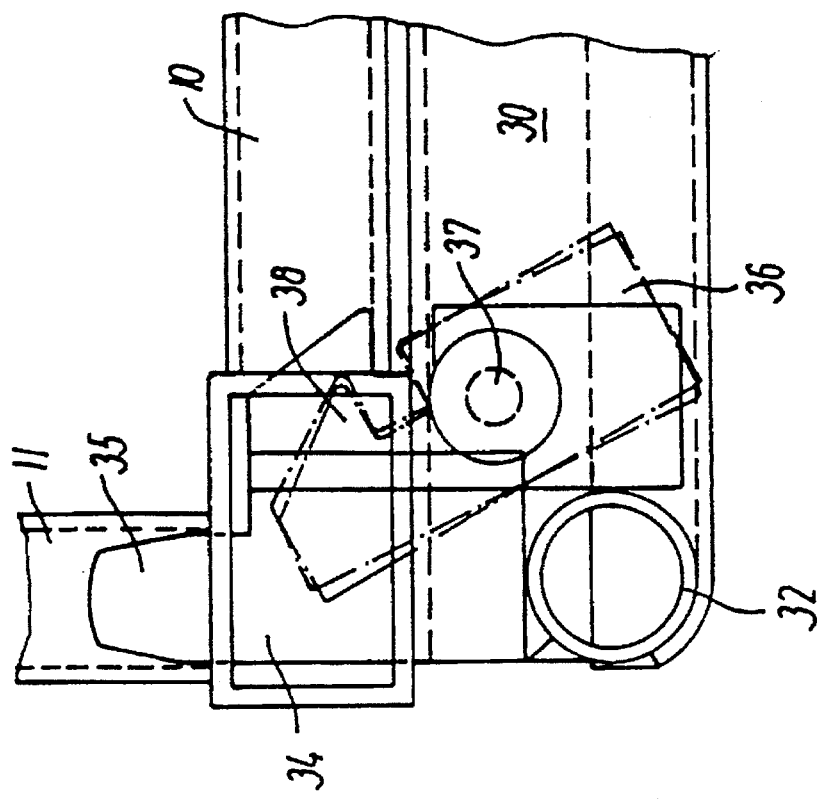

FIGS. 6 and 7 show the mounting means on a side-board corresponding to the matter shown in EP-A-0 336 773, the mounting means being changed somewhat here. FIGS. 6 and 7 are top and partially sectional views of the corner joints. A plurality of pipes 32 extends upwards from a base part 30, and these pipes 32 with transverse stiffeners (not shown) constitute the detachable sides or side-boards, which are discussed in detail in said EP document. Further, a horizontally protruding hook 33 with a hook head 34, which can be received in the longitudinal frame part 10, extends from the base part 30. The hook 33 may either be solid so that the pipe opening in the frame part 10 is filled completely, or may be of sheet iron so that just part of the frame part is filled.

When the side-board is to be mounted, the hook 33 is first moved into position, and then the locking means shown in FIG. 6 are engaged by a guided movement, since one end of the base part 30 is locked by the hook 33. The locking means shown in FIG. 6 comprise a protruding block 34 which, when the side-board is mounted correctly, rests on the pipe section 12 and has a guide pin 34 filling the opening in the frame part 11 completely or partly. Further, a pivotable latch 36 is provided, said latch being pivotally mounted on the base part 30 with a bolt 30 so that a nose 38 can be moved into the opening of the frame part 10. This retains the guide pin 35 and the base part 30 in position. The latch 36 is shown in three positions to illustrate its pattern of movement.

The base part 30 is made of a hollow, rectangular profile pipe, and the hook 33, the latch 36 and the block 34 are secured to the internal cavity of the base part and protrude therefrom through suitably shaped slots. The latch 36 may expediently be spring biassed, which, however, is not shown, since it will be easy for a skilled person to design such spring bias.

Figure 8:
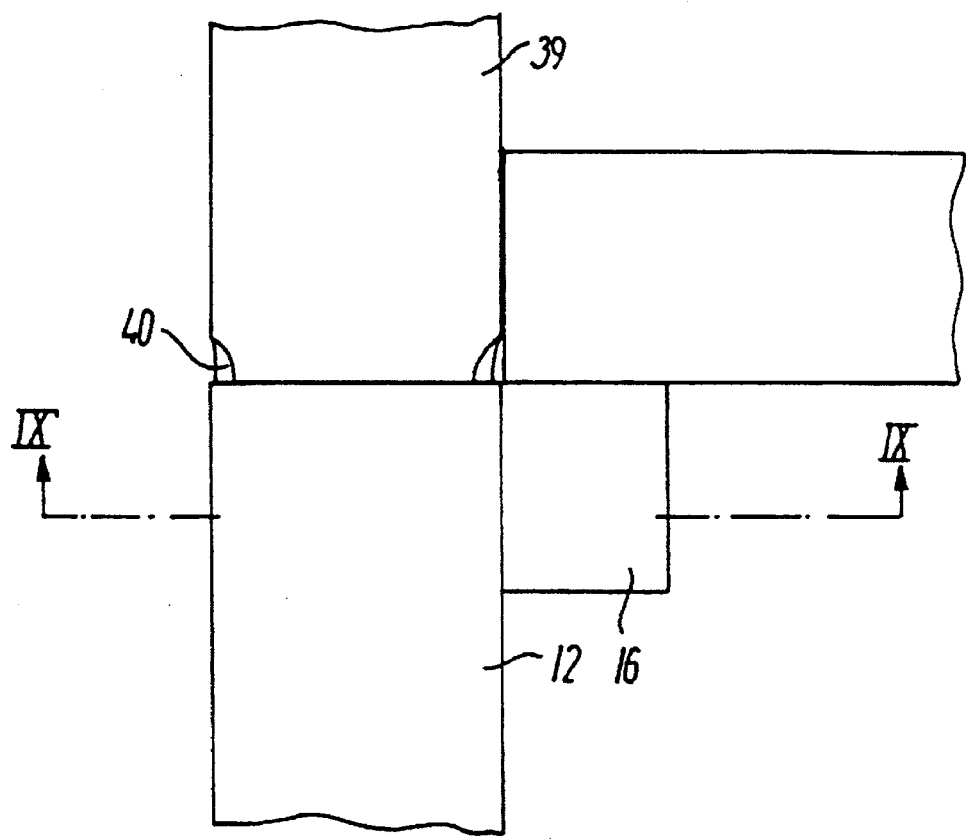
FIG. 8 shows a corner structure according to the invention in connection with a corner column or pipe member on which shelves may be placed.
Figure 9:
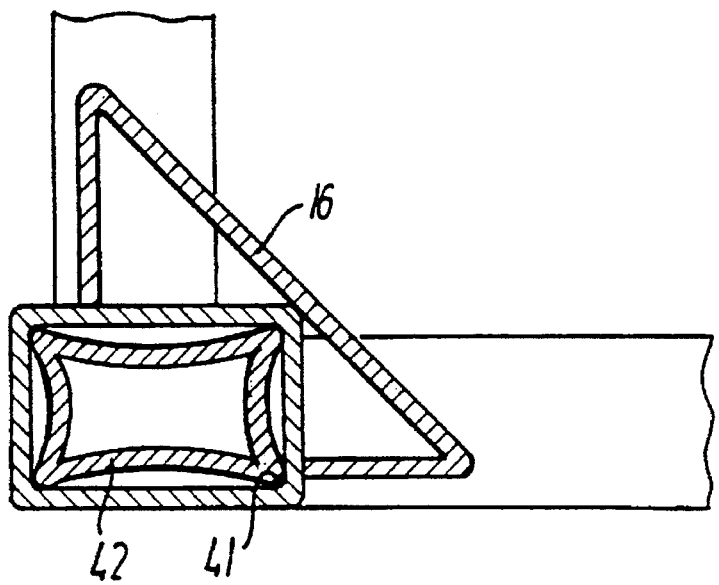
FIG. 9 shows a corner structure according to the invention in connection with a corner column or pipe member on which shelves may be placed.

FIGS. 8 and 9 show how a corner pipe or a column 39 is mounted in the pipe section 12, a constricted end part 40 being received and retained. The end part 40 extends approximately halfway through the pipe section 12. Upper parts of this type having columns and shelves for roller carriages are known e.g. from GB patent specification 1 569 405 and will therefore not be described in detail. FIG. 9, which shows a section along the line IX—IX, illustrates an expedient embodiment of the end part 40, which is compressed so that the corners 41 protrude while the portions 42 therebetween are curved inwards. Just the corners 41 will hereby be in contact with the opening of the pipe section 12, which facilitates mounting.

Figure 10:
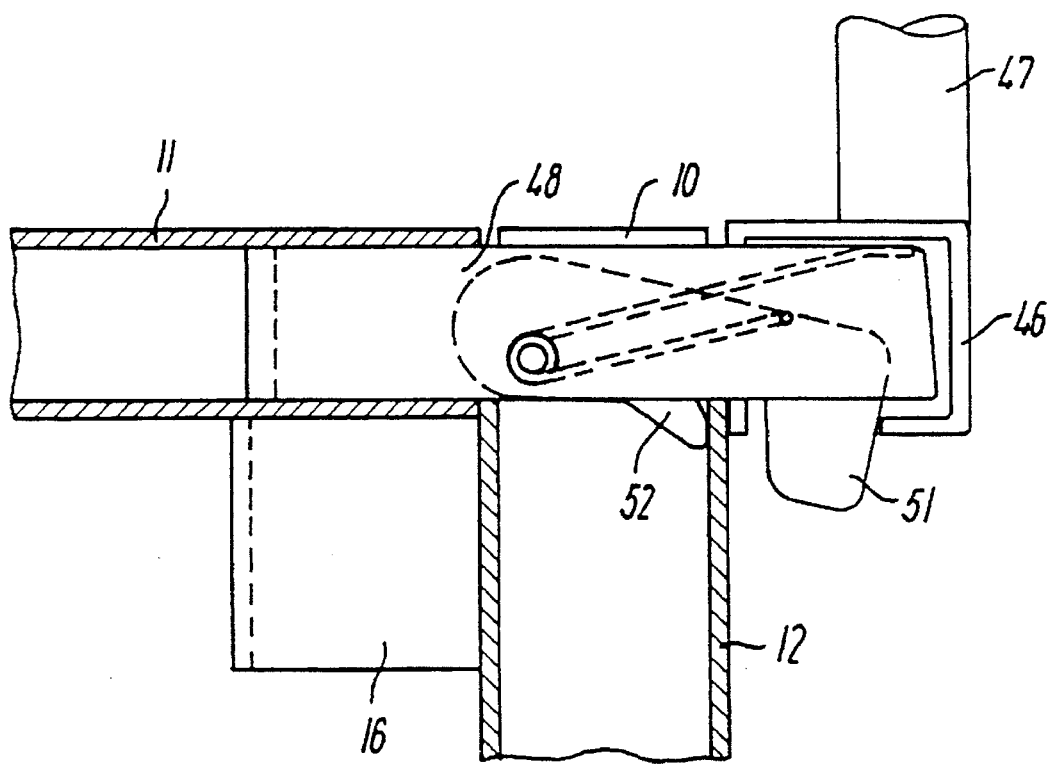
FIG. 10 shows a corner structure according to the invention used in connection with another type of side-boards.
Figure 11:
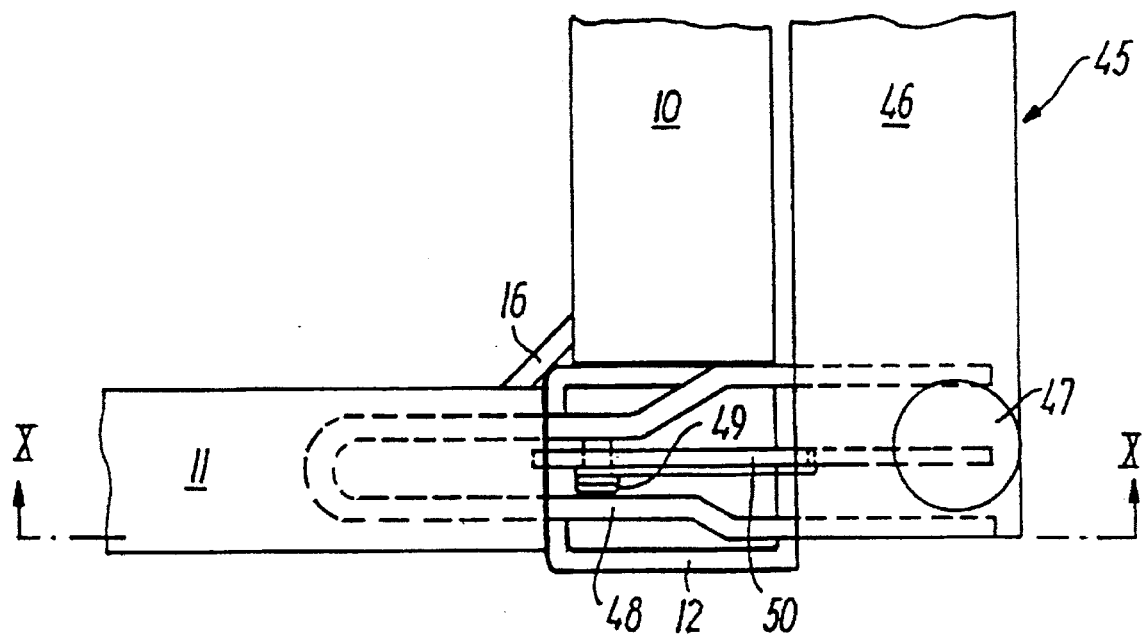
FIG. 11 shows the same as FIG. 10, seen from above.

FIGS. 10 and 11 show how another type of a side-board can be arranged in the container base according to the invention. The corner of the container base is shown in principle by the horizontal pipe profiles 10, 11 and the vertical profile 12. Like before, an embodiment has been selected in which the upper edge of the pipe profile 12 is flush with the internal bottom face of the pipe profile 11.

The side-board is indicated at 45 and comprises a bottom member 46 having a plurality of upwardly extending columns 47. At each end the side-board has a coupling means which protrudes perpendicularly from the plane of the side-board, and which will be explained more fully below.

The coupling means comprises a lock strap 48, which is tapered so that it can easily be inserted into the pipe profile 11, and so that the wide portion of the lock strap can engage the end of the pipe profile 10. The lock strap has a pin 49 which mounts a latch 50 which is spring biassed, as appears from FIG. 10. The latch has an activation part 51 extending down through the bottom member 46, and the latch moreover has a locking projection 52 ensuring that the side-board cannot be pulled clear of the container base.

Upon upward actuation of the activation part 51, e.g. by the foot, the locking projection 52 moves upwards and clear of the internal wall of the profile pipe 12, so that the side-board can be pulled clear of the container base.

It will be seen in this embodiment that the alignment of the upper edge of the pipe profile 12 with the internal bottom face of the pipe profile 11 ensures that the upper edge of the pipe profile 12 serves both as a guide in the introduction of the locking strap 48 and also serves as a support for the absorption of the moment which is generated when the side-board is laterally affected upward.

The vertical hollow pipe sections 12 may advantageously be provided with tapering, lower ends, e.g. corresponding to the end members 40 on the corner pipe or the column 39. The carriage bottoms can hereby be stacked during production and be transported safely before they are provided with wheels. Since the unfinished carriage bottoms are locked mutually, very stable stacking is achieved, and crossstacking is permitted, which means that the carriage bottoms can be turned 90° with respect to each other to form two interlacing stacks which are turned 90° with respect to each other, which results in good utilization of the storage space during production. When wheels are mounted only on the lowermost bottom, it will be easy to handle the cross-stack.

The corner arrangement according to the invention provides access for columns, where an inward bend of these is prevented to a great extent. The reason is that the reaction point thereof is located at the same level as the upper side of the pipes.

It will simultaneously be possible to stack two carriage bottoms with corner pipes or columns on top of each other. This is important in a situation of use, since two carriages having columns and shelves on which e.g. potted plants are placed, can be stacked on top of each other, so that the downwardly tapering, vertical pipe section 12 of the upper carriage bottom is received and rests in the hollow, upwardly open columns 39 of the lower carriage bottom. This provides better utilization of the space during transport of commodities, the container being used for transporting e.g. potted plants from a wholesaler to a retainer. This transport usually takes place in trucks or containers.

We claim:

1. A container base adapted to be built together with at least one upper part, the base comprising:

a rectangular frame structure substantially horizontal in use and including pipe parts having a form of hollow profile pipes adapted to be guide and fixing elements for mounting the upper part, the frame structure having pairs of substantially horizontal, mutually perpendicular pipe parts at corners of the frame structure, the pairs of substantially horizontal, mutually perpendicular pipe parts having open exposed ends, at least one of the corners of the frame structure comprising a further pipe section extending substantially perpendicularly to the frame structure, an upper open exposed end of the further pipe section being terminated at a level no higher than a lower side wall of the substantially horizontal, mutually perpendicular pipe parts and secured to an end edge of a lower of one of the pair of pipe parts of the at least one of the corners.

2. A container base according to claim 1, wherein the pairs of pipe parts are mutually located in a corner so that each pipe part of the pairs of pipe parts receives a fixing means corresponding to an internal dimension of the pipe part, stiffening means being provided for mutually joining of each pair of pipe parts in respective corners.

3. A container base according to claim 2, wherein a lower edge of a pipe part of the pair of pipe parts at the at least one of the corners adjoins and is interconnected to an edge area of the further pipe section.

4. A container base according to claim 3, wherein the stiffening means is an elongate metal plate having two bends transversely to a longitudinal direction, and is secured at its ends to the further pipe section.

5. A container base according to claim 4, wherein the stiffening means is additionally secured to an underside of the pair of pipe parts of each corner.

6. A container base according to claim wherein the stiffening means extends upwardly between the pipe parts and is secured to side faces of the pipe parts.

7. A container base according to claim 6, wherein at least one of the pipe parts of the frame structure at respective corners is provided with an opening spaced from the stiffening element and cooperates with a spring loaded coupling pin to mount the at least one upper part, the spring loaded coupling pin, in a rest position, extending outside a tubular connecting means on the at least one upper part, the tubular connecting means being receivable in the at least one of the pipe parts in the frame structure when the at least one upper part is mounted.

8. A container base according to claim 7, characterized in that the pipe parts of the frame structure and the further pipe section have rectangular cross-sections.

9. A container base according to claim 7, further comprising wheels mounted at interior edges of the frame structure at respective corners thereof.

10. A container base according to claim 9, wherein a corner pipe for a plurality of shelves is mountable in the further pipe section, and wherein the guide and fixing elements in the pipe parts receive and retain the connecting means on the at least one upper part, and wherein a plurality of upwardly extending guide flaps are provided along a rim of the frame structure so as to serve as stops for goods on the container base.

* * * * *

UNITED STATES PATENT AND TRADEMARK OFFICE
CERTIFICATE OF CORRECTION

PATENT NO. : 5,662,343
DATED : SEPTEMBER 2, 1997
INVENTOR(S) : MOGENSEN ET AL.

It is certified that error appears in the above-indentified patent and that said Letters Patent is hereby corrected as shown below:

Col. 1, line 6: "et" should read —at—

Col. 1, line 13: "fur" should read —for—

Col. 1, line 14: "end" should read —and—

Col. 1, line 15: "end" should read —and—

Col. 1, line 21: "end" should read —and—

Col. 1, line 30: "end" should read —and—

Col. 1, line 65: insert —:— after the word "which"

Col. 6, line 1, claim 6: insert —4— after the word "claim"

Signed and Sealed this

Third Day of November, 1998

*Attest:*

BRUCE LEHMAN

*Attesting Officer*    *Commissioner of Patents and Trademarks*